US008883924B2

(12) United States Patent
Yoo et al.

(10) Patent No.: US 8,883,924 B2
(45) Date of Patent: *Nov. 11, 2014

(54) RESIN BLEND

(71) Applicant: LG Chem, Ltd., Seoul (KR)

(72) Inventors: Houng Sik Yoo, Seoul (KR); Jin Young Ryu, Daejeon (KR); Woo Sung Kim, Daejeon (KR); Han Na Lee, Daejeon (KR); Eun Joo Choi, Daejeon (KR); Hyeon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,920

(22) Filed: Aug. 12, 2013

(65) Prior Publication Data

US 2013/0323510 A1 Dec. 5, 2013

Related U.S. Application Data

(63) Continuation of application No. PCT/KR2012/010058, filed on Nov. 26, 2012.

(30) Foreign Application Priority Data

Nov. 25, 2011 (KR) .................. 10-2011-0124653

(51) Int. Cl.
| | | |
|---|---|---|
| C08L 27/10 | (2006.01) | |
| C08L 43/00 | (2006.01) | |
| C08L 101/02 | (2006.01) | |
| C08J 5/00 | (2006.01) | |
| C08L 35/04 | (2006.01) | |
| C08L 25/04 | (2006.01) | |
| C08L 33/04 | (2006.01) | |

(52) U.S. Cl.
CPC .............. *C08L 35/04* (2013.01); *C08L 101/02* (2013.01); *C08J 5/00* (2013.01); *C08L 25/04* (2013.01); *C08L 33/04* (2013.01)
USPC ........... 525/209; 525/222; 525/232; 525/238; 525/241; 525/191; 428/407; 428/405

(58) Field of Classification Search
CPC ..................................................... C08F 230/08
USPC .......................... 525/209, 222, 232, 238, 241
See application file for complete search history.

(56) References Cited

U.S. PATENT DOCUMENTS

| | | | | |
|---|---|---|---|---|
| 4,885,209 | A * | 12/1989 | Lindner et al. ................ 428/420 |
| 6,090,902 | A * | 7/2000 | Kuo et al. ..................... 526/279 |
| 6,210,856 | B1 * | 4/2001 | Lin et al. ..................... 430/270.1 |
| 6,478,484 | B1 * | 11/2002 | Singh ............................ 396/611 |
| 2008/0306222 | A1 | 12/2008 | Sanada et al. | |

FOREIGN PATENT DOCUMENTS

| | | |
|---|---|---|
| KR | 10-2011-0003061 A | 1/2011 |
| KR | 10-2011-0026318 A | 3/2011 |
| KR | 10-2011-0059173 A | 6/2011 |

OTHER PUBLICATIONS

"Solid Surface Energy Data" flyer, 2007.*
Keestra et al., "Two Component Injection Molding of Phase Separating Blends" International Polymer Processing, vol. 21, No. 2, pp. 168-174 (2006).
Evolution of Viscosities and Morphology for the Two-Phase System Polyethylene Oxide/Poly(dimethylsiloxane) Rheol Acta, vol. 47 p. 469-476 (2008).

* cited by examiner

*Primary Examiner* — Irina Krylova
(74) *Attorney, Agent, or Firm* — McKenna Long & Aldridge, LLP

(57) ABSTRACT

Provided is a resin blend including a first resin and a second resin, the second resin having a hydrophobic functional group in a side chain and having a surface energy difference of 0.1 to 20 mN/m from the first resin at 25° C., the resin blend being capable of forming a layer separation structure. Also, provided are a pellet, a method for preparing the same, and a resin molding article having a specific layer separation structure. The resin blend may not only improve mechanical properties and surface hardness of the molding article but also shorten process time, increase productivity and reduce production cost by omitting an additional surface coating step.

13 Claims, 4 Drawing Sheets

RESIN BLEND

This application is a Continuation Bypass Application of International Patent Application No. PCT/KR2012/010058, filed Nov. 26, 2012, and claims the benefit of Korean Patent Application No. 10-2011-0124653 filed on Nov. 25, 2011, in the Korean Intellectual Property Office, the disclosures of which are incorporated herein by reference.

TECHNICAL FIELD

The present application relates to a resin blend, a pellet, a method of preparing a resin molding article using the same, and a resin molding article.

BACKGROUND ART

Since a plastic resin can be easily processed and has satisfactory properties such as tensile strength, modulus, heat resistance, and impact resistance, the resin has been used for various purposes such as for vehicle components, helmets, electric machine components, spinning device components, toys, or pipes.

Particularly, since a resin used for home appliances, vehicle components, toys, and the like comes in direct contact with the body, the resin should be environmentally friendly and have satisfactory surface hardness. However, when the resin is generally exposed to the outside for a predetermined time or more, the resin is easily discolored and decomposed by oxygen and ozone in the air, sunlight, or the like. In order to improve weak weather resistance and low impact resistance of the resin, an additional coating or plating process has been generally applied to the resin. However, the coating or plating process reduces the economy and efficiency of a process of preparing the plastic resin. Also, when the coating or plating process is applied, a large number of hazardous materials may be produced during the coating or plating process itself or in a product disposal process.

Therefore, various methods capable of improving scratch resistance, heat resistance and weather resistance of the resin without the coating or plating process have been proposed. For example, methods of improving physical properties such as wear resistance and rigidity by adding inorganic particles to the resin have been proposed. However, according to these methods, the plastic resin may become more difficult to process and have reduced impact resistance and glossiness due to addition of the inorganic particles.

DISCLOSURE

Technical Problem

The present application is directed to providing a resin blend, a pellet, a method of preparing a resin molding article using the same, and a resin molding article.

Technical Solution

One aspect of the present application provides a resin blend including a first resin and a second resin, the second resin having a hydrophobic functional group represented by the following Chemical Formula 1 in a side chain, and having a surface energy difference of 0.1 to 20 mN/m from the first resin at 25° C., the resin blend being capable of forming a layer separation structure.

[Chemical Formula 1]

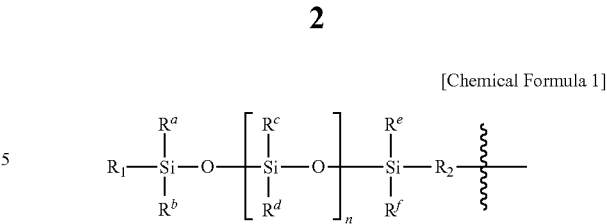

In Chemical Formula 1, $R_1$ is an alkyl group having 1 to 16 carbon atoms, $R_2$ is a single bond or an alkylene group having 1 to 16 carbon atoms, $R^a$ to $R^f$ are each independently an alkyl group having 1 to 16 carbon atoms, and n is a number from 1 to 100.

Another aspect of the present application provides a pellet including a core containing a first resin, and a shell containing a second resin, the second resin having a hydrophobic functional group represented by Chemical Formula 1 in a side chain and a surface energy difference of 0.1 to 20 mN/m from the first resin at 25° C.

Still another aspect of the present application provides a resin molding article including a first resin layer; a second resin layer formed on the first resin layer, and an interface layer containing a first resin and a second resin and formed between the first resin layer and the second resin layer, in which the second resin layer includes the second resin having a hydrophobic functional group represented by Chemical Formula 1 in a side chain.

Yet another aspect of the present application provides a method of preparing a resin molding article including melting the resin blend to form a melt blend, and processing the melt blend to form a layer separation structure.

Yet another aspect of the present application provides a method of preparing a resin molding article including melting the pellet to form a melt blend, and processing the melt blend to form a layer separation structure.

Hereinafter, a resin blend, a pellet, a method of preparing a resin molding article using the same, and a resin molding article according to specific embodiments of the present application will be described in detail.

In the present application, the term "blend" may be a blend of at least two different resins. Types of the blend are not specifically limited, but the blend may include a case where at least two resins are mixed in one matrix or a case where at least two pellets are mixed. Particularly, as shown in FIG. 1, the one matrix in which at least two resins are mixed may be a pellet 10 including at least two resin 11 compositions. On the other hand, the case where at least two pellets are mixed includes the case where at least two pellets 20 and 21, each including one resin, are mixed, as shown in FIG. 2. The different resins may have different physical properties. For example, physical properties may include surface energy, melt viscosity, or solubility parameter.

The term "melt processing" may mean a process of melting a resin blend at a melt temperature (Tm) or more in order to form a melt blend, and of forming an intended molding article by using the melt blend, and an example thereof includes injection molding, extrusion molding, hollow molding, transfer molding, film blowing, fiber spinning, calendaring, thermoforming, foam molding, or the like.

The term "resin molding article" may mean a pellet or a product formed from a resin blend. The resin molding article is not particularly limited, but for example may include a vehicle component, an electronic device component, a mechanical component, a functional film, a toy, or a pipe.

The term "layer separation" may mean that a layer substantially formed by one resin is located or arranged on a layer substantially formed by another resin. The layer substantially formed by one resin may mean that one resin does not form a sea-island structure and is continuously present in an entire layer. The sea-island structure means that a phase-separated resin is partially distributed in the entire resin blend. Furthermore, "substantially formed" may mean that one resin is present or rich in one layer.

According to the present application, the resin molding article formed from the resin blend by melt processing may have improved mechanical and surface properties, and reduced production cost and production time. For example, the resin blend of the present application may be layer-separated by melt processing, and may be used to prepare a resin molding article providing a specific function such as a high hardness function for the surface without separate processes such as coating and plating.

Layer separation of the resin blend may occur due to difference of physical properties between a first resin and a second resin and/or molecular weight distribution of the second resin. The physical properties may include, for example, surface energy, melt viscosity, and solubility parameter. The present description pertains to the blend of two resins, but it is clear to those skilled in the art that at least three resins having different physical properties may be mixed and layer-separated by melt processing.

According to one embodiment of the present application, there is provided a resin blend including a first resin and a second resin, the second resin having a surface energy difference of 0.1 to 20 mN/m from the first resin at 25° C., the resin blend being capable of forming a layer separation structure.

The first resin and the second resin may have a surface energy difference of 0.1 to 20 mN/m, 0.5 to 20 mN/m, 1 to 20 mN/m, 3 to 20 mN/m, 5 to 20 mN/m or 5 to 18 mN/m at 25° C. When the surface energy difference is lower than 0.1 mN/m, since the first resin and the second resin are easily mixed and thus the second resin is hardly transferred to the surface, the layer separation phenomenon does not easily occur. Further, when the surface energy difference is higher than 20 mN/m, the first resin and the second resin may not be connected to each other and may separate or detached from each other.

The upper limit and/or lower limit of the surface energy difference are/is within a range of 0.1 to 20 mM/m, and may depend on physical properties of the first resin. Particularly, when the first resin is used as a base resin and the second resin is used as a functional resin for improving surface properties of the first resin, the second resin may be selected so as to have a surface energy difference of 0.1 to 20 mN/m from the first resin at 25° C. As one example, the surface energy difference may be selected in view of hydrophobicity of the second resin in the melt blend of the first resin and the second resin.

The melt blend of the first resin and the second resin having a surface energy difference of 0.1 to 20 mN/m at 25° C. may be layer-separated by melt processing. As one example, when the resin blend of the first resin and the second resin is melt-processed and exposed to air, the first resin and the second resin may separate due to hydrophobicity difference. Particularly, since the second resin having lower surface energy than the first resin has high hydrophobicity, the second resin may be transferred so as to come to contact with air so that a second resin layer may be formed on the air side. Further, the first resin may be located on the opposite side from the air while being contact with the second resin. Therefore, the resin blend is layer-separated between the first resin and the second resin.

As one example of the present application, the second resin may include a hydrophobic functional group in a side chain. As the second resin includes a hydrophobic function group in a side chain thereof, surface energy difference between the second resin and the first resin is further increased and thus layer separation efficiency also may be increased.

The hydrophobic functional group may be represented by, for example, the following Chemical Formula 1:

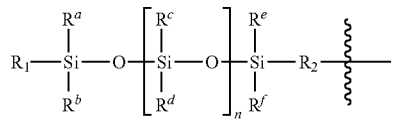

In Chemical Formula 1, $R_1$ is an alkyl group having 1 to 16 carbon atoms, $R_2$ is a single bond or an alkylene group having 1 to 16 carbon atoms, $R^a$ to $R^f$ are each independently an alkyl group having 1 to 16 carbon atoms, and n is a number from 1 to 100. The alkyl group may be a straight-chain or branched-chain alkyl group having 1 to 16 carbon atoms, 1 to 12 carbon atoms, 1 to 6 carbon atoms, or 1 to 4 carbon atoms, but is not limited thereto.

The alkylene group may be a straight-chain or branched-chain alkylene group having 1 to 16 carbon atoms, 1 to 12 carbon atoms, 1 to 6 carbon atoms, or 1 to 4 carbon atoms, but is not limited thereto.

The single bond means that a separate atom is absent at the portion represented by $R_2$.

n may be controlled according to the sum of carbon atoms of $R_1$ and $R^a$ to $R^f$. For example, when the sum of carbon atoms of $R_1$ and $R^a$ to $R^f$ is large, n may be controlled to be a small value. When the sum of carbon atoms of $R_1$ and $R^a$ to $R^f$ is small, n may be controlled to be a large value. As one example, n may be controlled such that the hydrophobic functional group has a weight average molecular weight of 220 to 10000, 220 to 8000, 220 to 6000, 300 to 6000, 350 to 6000, or 400 to 6000. For example, when $R_1$ and $R^a$ to $R^f$ are all a methyl group, n may be 1 to 100, 1 to 80, or 1 to 70. When $R_1$ and $R^a$ to $R^f$ are any substituents other than a methyl group, n may be controlled to have the aforementioned weight average molecular weight according to carbon atoms of the substituents.

n may be, for example, an integer or a fraction. In one example, when n is an integer, it refers to an n value of Chemical Formula 1 for one molecule contained in the second resin. In another example, when n is a fraction, it refers to an average value of n values of Chemical Formula 1 for at least two molecules contained in the second resin.

A hydrophobic functional group represented by Chemical Formula 1 may be introduced into the second resin using a monomer represented by, for example, the following Chemical Formula 2:

[Chemical Formula 2]

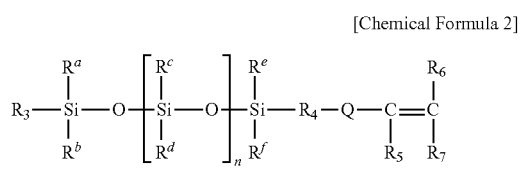

In Chemical Formula 2, $R_3$ is an alkyl group having 1 to 16 carbon atoms, $R_4$ is a single bond or an alkylene group having 1 to 16 carbon atoms, Q is a single bond, —COO—, —OCO—, —OCOO—, —CO—, —O—, or —NH—, $R_5$ to $R_7$ are each independently hydrogen or an alkyl group having 1 to 4 carbon atoms, $R^a$ to $R^f$ are each independently an alkyl group having 1 to 16 carbon atoms, and n is a number from 1 to 100. Herein, the alkyl group, the alkylene group, single bond, and n are as exemplified in Chemical Formula 1.

Examples of the monomer represented by Chemical Formula 2 include (meth)acryloxyalkyl terminated polydimethylsiloxane such as (meth)acryloxymethyl terminated polydimethylsiloxane, (meth)acryloxyethyl terminated polydimethylsiloxane, (meth)acryloxypropyl terminated polydimethylsiloxane, (meth)acryloxybutyl terminated polydimethylsiloxane, (meth)acryloxypentyl terminated polydimethylsiloxane, (meth)acryloxyhexyl terminated polydimethylsiloxane, (meth)acryloxyheptyl terminated polydimethylsiloxane, or (meth)acryloxyoctyl terminated polydimethylsiloxane, monovinyl terminated polydimethylsiloxane, or the like.

The resin blend may separate into at least two layers. As one example, when two surfaces of the melt-processed resin blend facing each other are exposed to air, the resin blend including the first resin and the second resin may separate into three layers, for example, a second resin layer/a first resin layer/a second resin layer, as shown in FIG. 3. On the other hand, when only one surface of the melt-processed resin blend is exposed to air, the resin blend may separate into two layers, for example, a second resin layer/a first resin layer. Further, when the resin blend including the first resin, the second resin and a third resin, all having different surface energies, is melt-processed, the melt processed resin blend may be layer-separated into five layers, for example, a third resin layer/a second resin layer/a first resin layer/a second resin layer/a third resin layer as shown in FIG. 4. Further, when all surfaces of the melt processed resin blend are exposed to air, the resin blend is layer-separated in all directions and a core-shell structure may be formed as shown in FIG. 5.

According to another embodiment of the present application, there is provided a resin blend including a first resin; and a second resin having a melt viscosity difference of 0.1 to 3000 pa*s from the first resin at a shear rate of 100 to 1000 s$^{-1}$ and a processing temperature of the resin blend.

The first resin and the second resin may have a melt viscosity difference of 0.1 to 3000 pa*s, 1 to 2000 pa*s, 1 to 1000 pa*s, 1 to 500 pa*s, 50 to 500 pa*s, 100 to 500 pa*s, 200 to 500 pa*s, or 250 to 500 pa*s, at a shear rate of 100 to 1000 s$^{-1}$ and a processing temperature of the resin blend. When the melt viscosity difference is lower than 0.1 pa*s, since the first resin and the second resin are easily mixed, the layer separation phenomenon does not easily occur. When the melt viscosity difference is higher than 3000 pa*s, the first resin and the second resin may not bond together and may detach from each other.

The upper limit and/or lower limit of the melt viscosity difference are/is within a range of 0.1 to 3000 pa*s, and may depend on physical properties of the first resin. Particularly, when the first resin is used as a base resin and the second resin is used as a functional resin for improving surface properties of the first resin, the second resin may be selected so as to have a melt viscosity difference of 0.1 to 3000 pa*s from the first resin at a shear rate of 100 to 1000 s$^{-1}$ and a processing temperature of the resin blend. As one example, the melt viscosity difference may be selected in view of fluidity of the second resin in the melt blend of the first resin and the second resin.

The resin blend including the first resin and the second resin having a melt viscosity difference of 0.1 to 3000 pa*s at a shear rate of 100 to 1000 s$^{-1}$ and a processing temperature of the resin blend is melt processed, and then may be layer-separated due to melt viscosity difference. As one example, when the resin blend of the first resin and the second resin is melt-processed and exposed to air, the first resin and the second resin may separate due to fluidity difference. Particularly, since the second resin having a lower melt viscosity than the first resin has high fluidity, the second resin may be transferred so as to come to contact with air so that a second resin layer may be formed on the air side. Further, the first resin may be located on the opposite side from the air while being contact with the second resin. Therefore, the resin blend is layer-separated between the first resin and the second resin.

As one example of the present application, the second resin may include a bulky organic functional group having a predetermined volume or more. According to introduction of a specific bulky organic functional group, the second resin may have higher hydrodynamic volume and lower melt viscosity. Therefore, the resin including the bulky organic functional group may cause the aforementioned layer separation phenomenon more easily in a melt-processing step. Specific examples of the bulky organic functional group include an alkyl group having 2 to 20 carbon atoms, 2 to 12 carbon atoms, 2 to 6 carbon atoms, 3 to 20 carbon atoms, 3 to 12 carbon atoms or 3 to 6 carbon atoms, an alicyclic ring having 5 to 40 carbon atoms, 5 to 25 carbon atoms or 5 to 16 carbon atoms, and an aromatic ring having 6 to 40 carbon atoms, 6 to 25 carbon atoms or 6 to 16 carbon atoms. However, the bulky organic functional group is not particularly limited as long as it has a large hydrodynamic volume, and such an organic function group may be included in the second resin.

Specific examples of the bulky organic functional group include an aliphatic functional group such as tertiary butyl, isobutyl, or isopropyl; an alicyclic ring functional group such as isobornyl or cyclohexyl; and an aromatic ring functional group such as naphthyl, phenyl, anthracenyl, or benzyl.

The melt viscosity may be measured by capillary flow, and means shear viscosity (pa*s) according to specific processing temperature and shear rate (s$^{-1}$).

The term "shear rate" means shear rate applied when the resin blend is processed, and may be controlled to be in a range of 100 to 1000 s$^{-1}$ according to processing method. It may be clear to those skilled in the art that the shear rate is controlled according to processing method.

The term "processing temperature" means the temperature at which the resin blend is processed. For example, when the resin blend is used for melt processing such as extrusion or injection, the term "processing temperature" means the temperature applied in the melt process. The processing temperature may be controlled according to resin to be applied to melt processing such as extrusion or injection. For example, the resin blend including the first resin (i.e., ABS resin) and the second resin obtained from a methylmethacrylate-based monomer may have a processing temperature of 210 to 240° C.

According to still another embodiment of the present application, there is a resin blend for forming a layer separation structure, including a first resin; and a second resin having a solubility parameter difference of 0.001 to 10.0 (J/cm$^3$)$^{1/2}$ from the first resin at 25° C.

The first resin and the second resin may have a solubility parameter difference of 0.001 to 10.0 (J/cm$^3$)$^{1/2}$, 0.01 to 5.0 (J/cm$^3$)$^{1/2}$, 0.01 to 3.0 (J/cm$^3$)$^{1/2}$, 0.01 to 2.0 (J/cm$^3$)$^{1/2}$, 0.1 to 1.0 (J/cm$^3$)$^{1/2}$, 0.1 to 10.0 (J/cm$^3$)$^{1/2}$, 3.0 to 10.0 (J/cm$^3$)$^{1/2}$, 5.0 to 10.0 (J/cm$^3$)$^{1/2}$ or 3.0 to 8.0 (J/cm$^3$)$^{1/2}$ at 25° C. The solubility parameter is an inherent property of the resin showing solubility according to polarity of each resin molecule, and the solubility parameter of each resin is well known. When the solubility parameter difference is lower than 0.001 (J/cm$^3$)$^{1/2}$, since the first resin and the second resin are easily mixed, the layer separation phenomenon does not easily occur. When the solubility parameter difference is higher than 10.0 $(J/cm^3)^{1/2}$, the first resin and the second resin may not bond together and may detach from each other.

The upper limit and/or lower limit of the solubility parameter difference are/is within a range of 0.001 to 10.0 $(J/cm^3)^{1/2}$, and may depend on physical properties of the first resin. Particularly, when the first resin is used as a base resin and the second resin is used as a functional resin for improving surface properties of the first resin, the second resin may be selected so as to have a solubility parameter difference of 0.001 to 10.0 $(J/cm^3)^{1/2}$ from the first resin at 25° C. As one example, the solubility parameter difference may be selected in view of miscibility of the second resin in the melt blend of the first resin and the second resin.

The resin blend including the first resin and the second resin having a solubility parameter of 0.001 to 10.0 $(J/cm^3)^{1/2}$ at 25° C. is melt processed, and then may be layer-separated due to solubility parameter difference. As one example, when the resin blend of the first resin and the second resin is melt-processed and exposed to air, the first resin and the second resin may separate due to miscibility difference. Particularly, the second resin having the solubility parameter difference of 0.001 to 10 $(J/cm^3)^{1/2}$ from the first resin at 25° C. may not mix with the first resin. Therefore, when the second resin has a lower surface tension or melt viscosity than the first resin, the second resin may be transferred so as to come to contact with air so that a second resin layer may be formed on the air side. Further, the first resin may be located on the opposite side from the air while being contact with the second resin. Therefore, the resin blend is layer-separated between the first resin and the second resin.

According to yet another embodiment of the present application, the second resin may have a molecular weight distribution (PDI) of 1 to 4.0, 1 to 3.5, 1 to 3.0, 1 to 2.8, 1.5 to 4.0, 1.5 to 3.5, 1.5 to 3.0 or 1.5 to 2.8. The upper limit and the lower limit of the molecular weight distribution of the second resin are within the range of 1 to 4.0.

When the molecular weight distribution of the second resin is higher than 4.0, the first resin and the second resin are easily mixed due to low molecular weight or fluidity of the second resin is reduced due to high molecular weight, and thus the layer separation phenomenon does not easily occur.

According to yet another embodiment of the present application, the second resin of the resin blend may have a weight average molecular weight (Mw) of 30,000 to 200,000, 50,000 to 200,000, 80,000 to 200,000, 50,000 to 150,000, 80,000 to 150,000, 50,000 to 120,000, or 80,000 to 120,000. The upper limit and the lower limit of the weight average molecular weight of the second resin are within the range of 30,000 to 200,000.

When the molecular weight molecular weight is less than 30,000, since the first resin and the second resin are easily mixed, the layer separation phenomenon does not easily occur. When the molecular weight molecular weight is more than 200,000, fluidity of the second resin is reduced, and thus the layer separation phenomenon does not easily occur.

Further, according to yet another embodiment of the present application, the second resin has a higher glass transition (Tg) than the first resin, and the first resin and the second resin may have a glass transition temperature difference of 10° C. or 20° C. or higher, or 25° C. or higher. A maximum value of the glass transition temperature between the first resin and the second resin is not particularly limited, but may be 150° C. or lower.

When the glass transition temperature of the second resin is at least 10° C. higher than that of the first resin, the second resin having the higher glass transition temperature is located at the outside of a resin molding article, and hence a surface hardness may be improved significantly.

Particularly, as one example of the present application, the second resin includes a hydrogen bond donor and a hydrogen bond acceptor, the second resin may have higher glass transition temperature, and thus surface hardness of the final molding article may be improved additionally.

In the present specification, the hydrogen bond donor is not particularly limited as long as it is a functional group or residue including hydrogen bonded to N or O, but examples thereof include an OH group, an $NH_2$ group, an NHR group, a COOH group, a $CONH_2$ group, an NHOH group, or a residue such as an NHCO bond, an NH bond, a CONHCO bond, or an NH—NH bond in a molecule.

Further, the hydrogen bond acceptor is not particularly limited as long as it is a functional group or residue including N or O, but examples thereof include an OH group, an OR group, an $NH_2$ group, an NHR group, an $NR_2$ group, a COOH group, a COOR group, a $CONH_2$ group, a CON $R_2$ group, an NHOH group, an NROR group, or a residue such as an NHCO bond, an NRCO bond, an O bond, an NH bond, an NR bond, a COO bond, a CONHCO bond, a CONRCO bond, an NH—NH bond, an NR—NH bond, or an NR—NR bond in a molecule. R may be an aliphatic hydrocarbon, an aromatic hydrocarbon, and a derivative thereof, and examples thereof may include an aliphatic hydrocarbon having 1 to 16 carbon atoms or 1 to 9 carbon atoms, an aromatic hydrocarbon having 5 to 30 carbon atoms or 5 to 16 carbon atoms, and a derivative thereof. Without being bound to any theory, most hydrogen bond donors may also serve as hydrogen bond acceptors. This is because the hydrogen bond donor provides hydrogen bonded to an atom having high electronegativity, which may serve as the hydrogen bond acceptor. However, there is also a —$(NH_4)^+$ group which serves only as a hydrogen bond donor.

A synergistic effect of glass transition temperature of the second resin may be exhibited when the second resin includes both the hydrogen bond donor and the hydrogen bond acceptor.

In one example, the hydrogen bond donor and the hydrogen bond acceptor may be present in one resin. The resin including both the hydrogen bond donor and the hydrogen bond acceptor may be a resin polymerized from a monomer containing the hydrogen bond donor and hydrogen bond acceptor, or a resin polymerized from a monomer containing the hydrogen bond donor with a monomer containing the hydrogen bond acceptor. Each of the monomers may be used alone or at least two monomers may be used.

In another example, the hydrogen bond donor and the hydrogen bond acceptor may be contained in different resins. In other words, a resin polymerized from a monomer containing the hydrogen bond donor is mixed with a resin polymerized from a monomer containing the hydrogen bond acceptor, and thus may be included in the second resin. Each of the monomers may be used alone or at least two monomers may be used. Further, where the second resin, which is formed of one resin or at least two resins, includes the hydrogen bond donor and the hydrogen bond acceptor, the second resin may further include other resins that do not include the hydrogen bond donor and/or the hydrogen bond acceptor.

A monomer which is capable of providing the hydrogen bond donor and/or the hydrogen bond acceptor for the second resin may include at least one residue or one functional group of the hydrogen bond donor and/or hydrogen bond acceptor, and for example, may include at least two or at least three.

The monomer including the hydrogen bond donor and/or hydrogen bond acceptor is not particularly limited, but examples thereof include vinyl ether such as methyl vinyl ether or ethyl vinyl ether; a nitrogen-containing monomer such as (meth)acrylamide, N-substituted (meh)acrylamide, N,N-substituted (meth)acrylamide; vinyl acetate; a hydroxyl group-containing monomer such as hydroxyalkyl (meth) acrylate; a carboxyl group-containing monomer such as (meth)acrylic acid, 2-(meth)acryloxy acetic acid, 3-(meth) acryloxy propyl acid, 4-(meth)acryloxy butyl acid, an acrylic double body, itaconic acid, maleic acid or maleic acid anhydride; a heterocyclic compound such as vinyl pyrrolidone, acryloyl morpholine or 2-ureido-4-pyrimidinone group-containing monomer.

Meanwhile, the first resin, which mainly determines physical properties of an intended molding article, may be selected according to process conditions and a type of the intended molding article. The first resin may include a general synthetic resin without specific limitation, and examples thereof include a styrene-based resin such as an acrylonitrile butadiene styrene (ABS)-based resin, a polystyrene-based resin, an acrylonitrile styrene acrylate (ASA)-based resin, or a styrene-butadiene-styrene block copolymer-based resin; a polyolefin-based resin such as a high density polyethylene-based resin, a low density polyethylene-based resin, or a polypropylene-based resin; a thermoplastic elastomer such as a ester-based thermoplastic elastomer or an olefin-based thermoplastic elastomer; a polyoxyalkylene-based resin such as a polyoxymethylene-based resin or a polyoxyethylene-based resin; a polyester-based resin such as a polyethylene terephthalate-based resin or a polybutylene terephthalate-based resin; a polyvinyl chloride-based resin; a polycarbonate-based resin; a polyphenylene sulfide-based resin; vinylalcohol-based resin; a polyamide-based resin; an acrylate-based resin; an engineering plastic; a copolymer thereof or a blend thereof. The engineering plastic has satisfactory mechanical and thermal properties. For example, the engineering plastic includes polyetherketone, polysulfone, and polyimide, and the like. In one example, the first resin may include a copolymer of a styrene-based resin and an acrylate-based resin.

The second resin means a resin which has different physical properties from the first resin, and which may provide satisfactory mechanical properties and high surface hardness for the surface of the intended molding article.

In one example, the second resin may be a polymer including, as a polymerization unit, a monomer represented by Chemical Formula 2 as described above. For example, the monomer represented by Chemical Formula 2, which is copolymerized with another monomer, may be included in the second resin. Specific examples of the resin included in the second resin are not limited significantly, but include a (meth) acrylate-based resin, an epoxy resin, an oxethane-based resin, an isocyanate-based resin, a fluorine-based resin, a copolymer thereof, and the like.

In one example, in a case where the (meth)acrylate-based resin is included in the second resin, the monomer represented by Chemical Formula 2 may be polymerized with a (meth)acryl monomer and included in the second resin. Examples of the (meth)acryl monomer include alkyl (meth) acrylates such as methyl (meth)acrylate, ethyl (meth)acrylate, propyl (meth)acrylate, butyl (meth)acrylate, cyclohexyl (meth)acrylate, octyl (meth)acrylate, lauryl (meth)acrylate, or stearyl (meth)acrylate; or glycidyl (meth)acrylate, or the like, and are not limited thereto.

In another example, in a case where the epoxy-based resin is included in the second resin, the monomer represented by Chemical Formula 2 may be polymerized with a monomer to provide the epoxy-based resin and included in the second resin. Examples of the epoxy-based resin include a bisphenol type epoxy-based resin such as bisphenol A type, bisphenol F type, bisphenol S type and hydrates thereof; a novolac type epoxy-based resin such as phenol novolac type or cresol novolac type; a nitrogen-containing ring type epoxy-based resin such as triglycidylisocyanurate type or hydantoin type; an alicyclic type epoxy-based resin; an aliphatic type epoxy-based resin; an aromatic type epoxy-based resin such as naphthalene type or biphenyl type; a glycidyl type epoxy-based resin such as glycidylether type, glycidylamine type, or glycidylester; a dicylco type epoxy-based resin such as dicylcopentadiene type; an ester type epoxy-based resin; or an ether-ester type epoxy-based resin, but are not limited thereto.

In another example, in a case where the oxetane-based resin is included in the second resin, the monomer represented by Chemical Formula 2 may be polymerized with an oxetane monomer having at least one oxetane ring and included in the second resin. Examples of the oxetane monomer include 1,4-bis[(3-ethyl-3-oxetanylmethoxy)methyl]benzene, di[1-ethyl(3-oxetanyl)]methylether, phenol novolac oxetane, terephthalate bisoxetane or biphenylene bisoxetane, or the like, but are not limited thereto.

In another example, in a case where the isocyanate-based resin is included in the second resin, the monomer represented by Chemical Formula 2 may be polymerized with an isocyanate group-containing monomer and included in the second resin. Examples of the isocyante group-containing monomer include methylene diphenyl diisocyante (MDI), toluene diisocyante (TDI), or isophorone diisocyanate (IPDI), or the like, but are not limited thereto.

In another example, in a case where the fluorine-based resin is included in the second resin, the monomer represented by Chemical Formula 2 may be polymerized with a fluorine-based monomer and included in the second resin. Examples of the fluorine monomer include tetrafluoroethylene, chlorotrifluoroethylene, fluorinated vinylidene, fluorinated vinyl, or the like, but are not limited thereto.

The content of the monomer represented by Chemical Formula 2 may be controlled suitably in a range such that hydrophobicity is provided for the second resin, and layer separation may occur between the first resin and the second resin. In one example, the content of the monomer represented by Chemical Formula 2 may be controlled to be in a range of 0.1 to 30 parts by weight, 0.1 to 25 parts by weight, 0.1 to 20 parts by weight, 0.1 to 15 parts by weight, 1 to 30 parts by weight, 1 to 25 parts by weight, 1 to 20 parts by weight, 1 to 15 parts by weight, 2 to 30 parts by weight, 2 to 25 parts by weight, 2 to 20 parts by weight, 2 to 15 parts by weight, or 2 to 12 parts by weight, based on 100 parts by weight of the entire monomer for polymerizing the second resin. The second resin includes a (meth)acrylate-based resin, an epoxy-based resin, an oxetane-based resin, an isocyanate-based resin, a fluorine-based resin, or a copolymer thereof, which means that the second resin includes the resin described above as a major resin thereof. Therefore, the second resin, as one example, may include a polymer polymerized from a monomer blend including a monomer capable of providing the major resin and a monomer represented by Chemical Formula 2. In another example, the second resin may include a polymer which polymerizes a monomer blend including a monomer capable of introducing the bulky organic functional group and/or the hydrogen bond donor and the hydrogen bond acceptor to a monomer capable of providing the major resin and a monomer represented by Chemical Formula 2.

Examples of the monomer capable of introducing the bulky organic functional group include tertiary butyl (meth)acrylate, isobutyl (meth)acrylate, isopropyl (meth)acrylate, isobornyl (meth)acrylate, cyclohexyl (meth)acrylate, naphthyl (meth)acrylate, phenyl (meth)acrylate, anthracenyl (meth)acrylate, or benzyl (meth)acrylate.

Further, the monomer capable of introducing the hydrogen bond donor and the hydrogen bond acceptor includes the exemplified monomers.

The resin blend may include 0.1 to 50 parts by weight of the second resin, or 1 to 20 parts by weight, 1 to 15 parts by weight or 1 to 10 parts by weight, based on 100 parts by weight of the first resin.

When the second resin is less than 0.1 parts by weight based on 100 parts by weight of the first resin, layer separation phenomenon does not occur. When the second resin is more than 50 parts by weight, production cost is increased due to expense of the second resin.

The resin blend may be prepared into a pellet by extrusion. The pellet prepared by using the resin blend includes a center portion at which the first resin which is located, and a shell at which the second resin which is layer-separated from the first resin is located, as shown in FIG. 6.

According to one embodiment of the present application, the present application may provide a pellet including a core containing a first resin, and a shell containing a second resin, the second resin having a hydrophobic functional group represented by Chemical Formula 1 in a side chain and a surface energy difference of 0.1 to 20 mN/m from the first resin at 25° C.

[Chemical Formula 1]

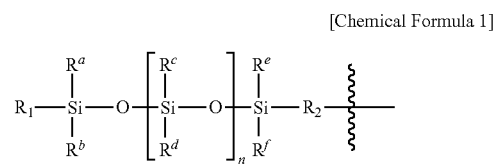

In Chemical Formula 1, $R_1$, $R_2$, $R^a$ to $R^f$ and n have the same meanings as defined above.

Further, as described above, the first resin and the second resin may have different physical properties. For example, the first resin and the second resin may have a surface energy difference of 0.1 to 20 mN/m at 25° C., a melt viscosity difference of 0.1 to 3000 pa*s at a shear rate of 100 to 1000 s$^{-1}$ and processing temperature of the pellet, and a solubility parameter difference of 0.001 to 10.0 (j/cm$^3$)$^{1/2}$ at 25° C. Further, the second resin may have a molecular weight distribution of 1 to 4.0, and a weight average molecular weight of 30,000 to 200,000. Further, the second resin may have a 10° C. to 150° C. higher glass transition temperature than the first resin.

Since specific details of kinds and physical properties of the first resin and the second resin are described above, they are not described again here.

Meanwhile, according to another embodiment of the present application, there is provided a method of preparing a resin molding article having a layer separation structure. The preparation method may include steps of melting the resin blend of the first resin and the second resin to form a melt blend, and of processing the melt blend to form a layer separation structure.

As described above, due to different physical properties of first resin and the second resin, a layer separation phenomenon may occur during melt-processing the resin blend, the layer separation phenomenon results in selective coating of the surface of a pellet or a molding article without separate processes.

Particularly, the second resin of the present application may have lower surface energy by introducing a hydrophobic function group represented by Chemical Formula 1 in a side chain, and thus layer separation efficiency is increased. Therefore, the second resin, for example, a high-hardness resin, is more easily located at the surface, and thus a molding article having improved mechanical and surface properties may be provided.

Meanwhile, the melt processing may be performed under shear stress, and for example may include extrusion and/or injection processing, but is not limited thereto.

According to still another embodiment of the present application, the resin blend may be prepared into a pellet by melt processing such as extrusion. For example, as described above, during melt-processing of the resin blend including the first resin and the second resin, the second resin is transferred so as to come in contact with air since the second resin is more hydrophobic than the first resin, and thus the second resin forms the surface layer of the pellet and the first resin may form a core located at the center portion of the pellet. Further, the resin blend is prepared into the pellet by extrusion and then the prepared pellet may be prepared into a molding article by melt processing such as injection. On the other hand, the resin blend may be directly prepared into a molding article by melt processing such as injection.

Applied temperature may be varied according to kinds of the first resin and the second resin used during melt processing of the resin blend.

The preparation method of the resin molding article may further include a step of curing a resultant obtained by melt-processing the resin blend, in other words, the melt-processed material of the resin blend. For example, the curing may include thermosetting or UV curing. Further, it may be clear to those skilled in the art that chemical or physical treatment may be performed additionally.

Meanwhile, the preparation method of the resin molding article may further include a step of preparing the second resin before melt-processing the resin blend. The second resin may be selected according to the first resin as described above, and the selected second resin may provide a specific function, for example, high hardness for the surface layer of the resin molding article. The method of preparing the second resin is not particularly limited as long as the resin is generally prepared through polymerization of a monomer. For example, the method may include bulk polymerization, solution polymerization, suspension polymerization, or emulsion polymerization.

The step of preparing the second resin may include a step of dispersing, in a reaction solvent, a monomer capable of introducing a hydrophobic functional group represented by Chemical Formula 1, for example, a monomer represented by Chemical Formula 2, and a monomer capable of providing a major resin; a step of adding, to the reaction solvent, at least one additive selected from the group consisting of a chain transfer agent, an initiator, and a dispersion stabilizer, followed by mixing, and reacting and polymerizing the blend at a temperature of 40° C. or higher.

The reaction media may be used without specific limitation as long as it may be generally used to prepare a synthetic resin, a polymer, or a copolymer. Examples of the reaction media include methyl ethyl ketone, ethanol, methyl isobutyl ketone, distilled water, or the like, and at least two reaction media may be mixed.

Examples of the chain transfer agent capable of being added to the reaction solvent include alkyl mercaptane such as n-butyl mercaptane, n-dodecyl mercaptane, tertiary dodecyl mercaptane, or isopropyl mercaptane; aryl mercaptane such as phenyl mercaptane, naphthyl mercaptane, or benzyl mercaptane; a halogen compound such as carbon tetrachloride; an aromatic compound such as α-methylstyrene dimmer or α-ethylstyrene dimmer, but are not limited thereto.

Examples of the initiator include a polymerization initiator generally used in suspension polymerization, for example, peroxide such as octanoyl peroxide, decanoyl peroxide, lauroyl peroxide, or an azo-based compound such as azobisisobutyronitrile, azobis-(2,4-dimethyl)-valeronitrile, without specific limitation.

Examples of the dispersion stabilizer included in the reaction media include an organic dispersant such as polyvinyl alcohol, polyolefine-maleic acid, or cellulose, or an inorganic dispersant such as tricalcium phosphate, but are not limited thereto.

Since specific details of the first resin, the second resin, and the hydrophobic functional group are described above, they are not described again here.

Meanwhile, according to still another embodiment of the present application, there is provided a resin molding article including a first resin layer; a second resin layer formed on the first resin layer; and an interface layer containing a first resin and a second resin and formed between the first resin layer and the resin layer, in which the second resin layer includes the second resin having a hydrophobic functional group represented by Chemical Formula 1 in a side chain.

[Chemical Formula 1]

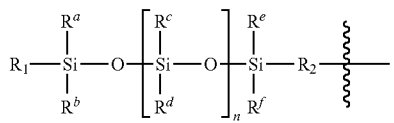

In Chemical Formula 1, $R_1$, $R_2$, $R^a$ to $R^f$ and n have the same meanings as defined above.

The resin molding article prepared from the resin blend including the specific first resin, and the second resin having different physical properties from the first resin and a hydrophobic functional group represented by Chemical Formula 1 in a side chain described above, may have a layer separation structure such that the first resin layer forms the inner portion of the resin molding article and the second resin layer forms the surface of the resin molding article.

A structure of the resin molding article, in other words, a structure where the first resin layer and the second layer are separated by an interface layer and the second resin layer is exposed to the outside, is new and not previously known in the related art. A coating or painting process may be omitted in order to improve surface properties, and thus production process time and production cost may be reduced and productivity of the final product may be increased. Even though a general resin is subjected to extrusion or injection, the layer separation effect is not easily exhibited and thus the aforementioned structure cannot be formed.

Particularly, the resin molding article may have higher layer separation efficiency according to use of the second resin including a hydrophobic functional group represented by Chemical Formula 1 in a side chain, and thus higher surface hardness of the molding article.

The "first resin layer" mainly includes the first resin, determines physical properties of the molding article, and forms the inner portion of the resin molding article. Also, the "second resin layer" mainly includes the second resin, is located at the outside of the resin molding article, and provides a specific function for the surface of the molding article.

Since specific details of the first resin, the second resin, and the hydrophobic functional group are described above, they are not described again here.

Meanwhile, the resin molding article is formed between the first resin layer and the second resin layer, and may include an interface layer including the resin blend of the first resin and the second resin. The interface layer, which is formed between the layer-separated first resin layer and second resin layer, serves as a boundary surface, and includes the blend of the first resin and the second resin. The blend may include the first resin and the second resin in a state of being physically or chemically bonded to each other, and the first resin layer and the second resin layer may be bonded through such blend.

As described above, the resin molding article may include a structure such that the first resin layer and the second resin layer are separated by the interface layer and the second resin layer is exposed to the outside. For example, the molding article may include a structure formed by stacking the first resin layer, the interface layer, and the second resin layer in order, and may be a structure formed by stacking the interface and the second layer above and below the first resin. Further, the resin molding article may include a structure formed by encompassing the first resin layer having various three-dimensional shapes, for example, a spherical shape, a polyhedral shape, and a sheet shape, with the interface and the second resin layer, in order.

The layer separation phenomenon shown in the resin molding article results from the way the resin molding article is prepared by applying the specific first resin and second resin having different physical properties. Examples of the different physical properties include surface energy, melt viscosity, and solubility parameter. Specific details of differences in the physical properties are as described above.

Meanwhile, the first resin layer, the second resin layer, and the interface layer were checked by SEM after subjecting a specimen to a low temperature impact test and etching a broken surface with THF vapor. With respect to the thickness of each layer, the specimen was cut with a diamond cutter to make a cross-section smooth using a microtoming apparatus, and the smooth cross-section was etched using a solution capable of selectively dissolving the second resin much better than the first resin. The etched cross-section portion dissolved differently depending on the content of each of the first resin and the second resin. The first resin layer, the second resin layer, the interface layer and surface were observed through shadows by viewing the cross-section from above 45° from the surface using SEM, and a thickness of each layer could be measured. In one example of the present application, 1,2-dichloroethane solution (10 volume % in EtOH) was used as the solution capable of selectively dissolving the second resin much better. However, the solution is not particularly limited as long as it yields higher solubility of the second resin than the first resin. The solution may be suitably selected and applied according to kinds and compositions of the second resin by those skilled in the art.

The interface layer may have a thickness of 0.01 to 95%, 0.1 to 70%, 0.1 to 50%, 5 to 50%, 10 to 50%, 15 to 50% or 20 to 50%, based on the total thickness of the second resin layer and the interface layer. When the interface layer has a thickness of 0.01 to 95% based on the total thickness of the second layer and interface layer, it has satisfactory adhesion between the first resin layer and the second resin layer, and thus peeling does not occur between the layers, and surface properties may be significantly improved due to the second resin layer. Whereas, when the thickness of the interface layer is much smaller than that of the second resin layer, the interface layer yields low adhesion between the first resin layer and the second resin layer, and thus peeling may occur between the layers. When the thickness of the interface layer is much larger than that of the second resin layer, there may be less improvement of surface properties due to the second resin layer.

The second resin layer may have a thickness of 0.01 to 60%, 0.01 to 40%, 0.01 to 20%, 0.01 to 10%, 0.01 to 5% 0.01 to 3%, or 0.1 to 3%, based on the entire resin molding article. When the second resin layer has a thickness within a predetermined range, improved surface hardness or scratch resistance may be provided for the surface of the molding article. When the thickness of the second resin layer is very small, it may be difficult to satisfactorily improve surface properties of the molding article. When the thickness of the second resin layer is very large, mechanical physical properties of a function resin itself are reflected in the resin molding article so that mechanical physical properties of the first resin may be changed.

Since specific details of the first resin, the second resin, differences in physical properties of first resin and the second resin, and the hydrophobic functional group contained in the second resin are described above, the related details are not described again here.

Meanwhile, according to yet another embodiment of the present application, there is provided a resin molding article containing a second resin, including a first resin layer; and a second resin layer formed on the first resin layer, in which components of the first resin layer are detected on the surface of the second resin layer by an infrared spectrometer, and the second resin layer includes the second resin containing the hydrophobic functional group represented by Chemical Formula 1 in a side chain.

A structure of the molding article, in other words, a structure where components of the first resin layer are detected on the surface of the second layer by an infrared spectrometer, is new and not previously known in the related art. In a general coating process or the like, components of the first resin layer are hardly detected on the surface of the second resin layer.

The surface of the second resin layer refers not to a surface on the side of the first resin layer but a surface exposed to the outside (e.g., air).

Since specific details of the first resin, the second resin, differences in physical properties of first resin and the second resin, and the hydrophobic functional group contained in the second resin are described above, the related details are not described again here.

In the present specification, differences in physical properties of first resin and the second resin may mean differences in physical properties of the first resin and second resin themselves, or differences in physical properties of the first resin layer and second resin layer.

According to yet another embodiment of the present application, there is provided a vehicle component, a helmet, an electric machine component, a spinning device component, a toy, a pipe, or the like, including the resin molding article.

Advantageous Effects

According to the present application, mechanical properties and surface hardness of the resin molding article can be improved. Also, there are provided a resin blend, a pellet, a method of preparing a resin molding article using the same, and a resin molding article prepared therefrom, which can exhibit effects such as reduction in process time, increase in productivity, and reduction of production cost, by omitting an additional surface coating step.

MODES OF THE INVENTION

Figure 1:
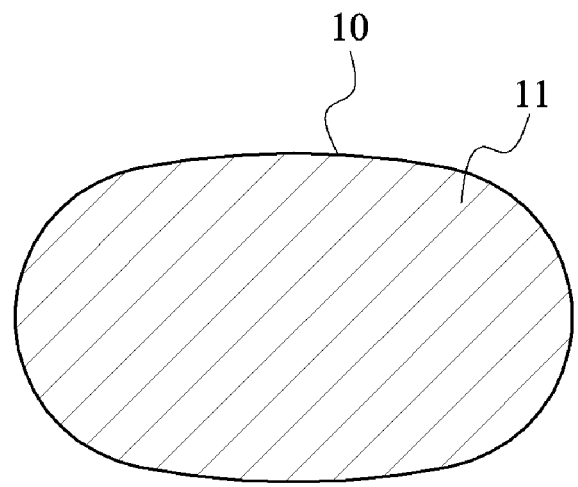
FIG. 1 is schematic diagram of a resin blend as one example of the present application.
Figure 2:
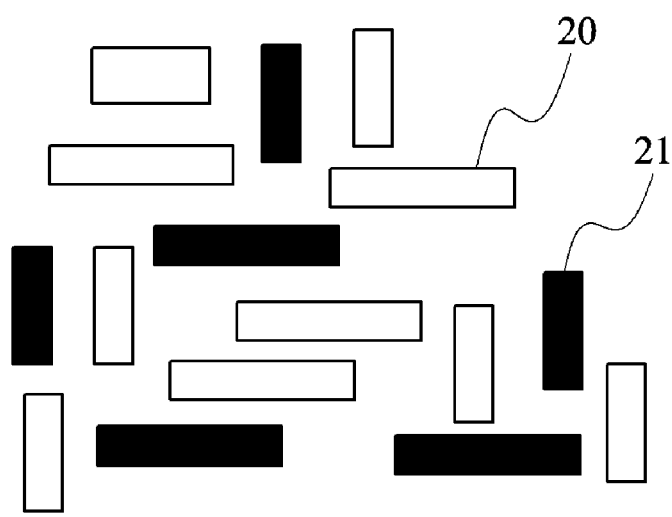
FIG. 2 is schematic diagram of a resin blend as another example of the present application.
Figure 3:
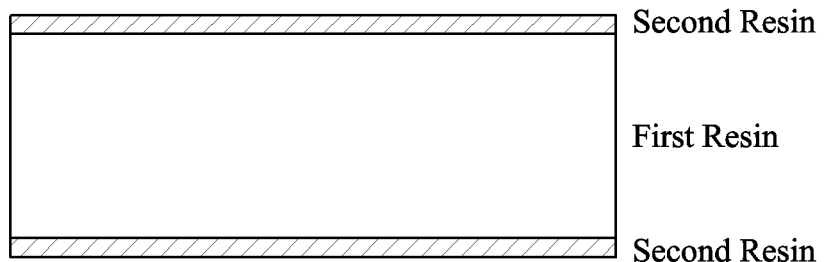
FIG. 3 is schematic diagram of a layer separation structure formed of a resin blend including a first resin and a second resin as one example of the present application.
Figure 4:
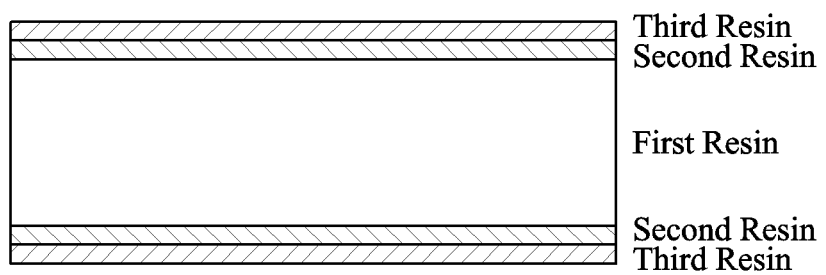
FIG. 4 is schematic diagram of a layer separation structure formed of a resin blend including a first resin, a second resin, and a third resin as another example of the present application.
Figure 5:
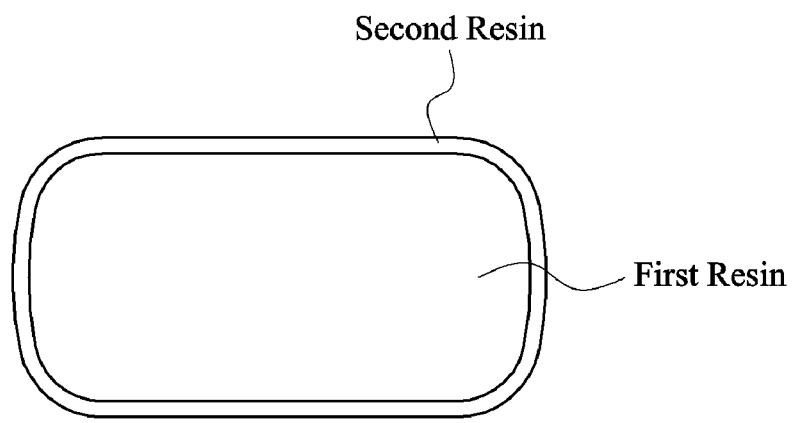
FIG. 5 is schematic diagram of a layer separation structure as another example of the present application.
Figure 6:
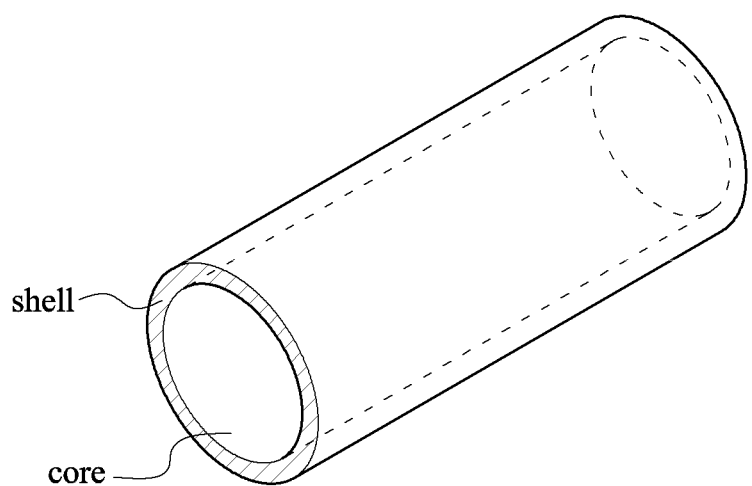
FIG. 6 is schematic diagram of a pellet having a core and a shell.
Figure 7:
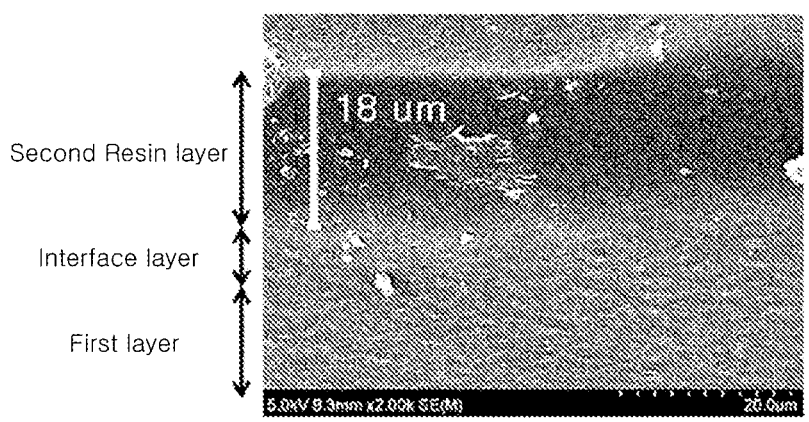
FIG. 7 shows a SEM photograph of a layer-separated cross-sectional morphology of a molding article prepared in Example 1.
Figure 8:
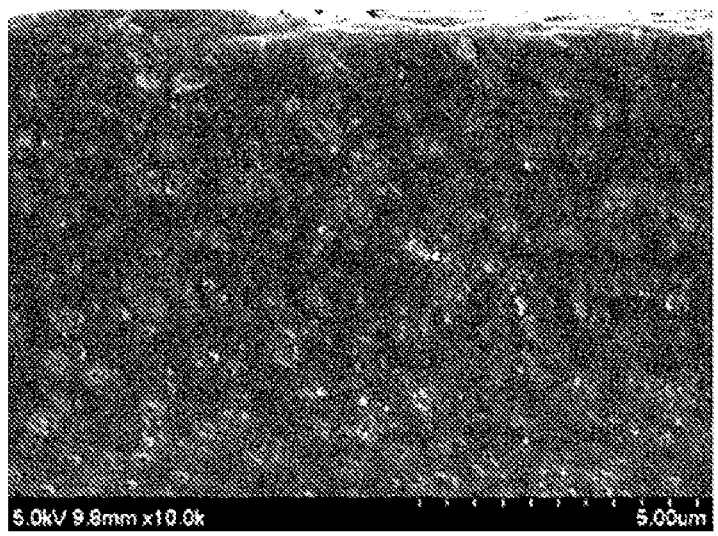
FIG. 8 shows a SEM photograph of a cross-sectional morphology of a molding article prepared in Comparative Example 1.

The present application will be described in more detail through the following Examples, which are not intended to limit the scope of the present application.

Measurement of Glass Transition Temperature

Glass transition temperature was measured using a differential scanning calorimeter (DSC823e, manufactured by Mettler-Toledo International Inc.). Specifically, 1 mg of the first resin sample or the second resin sample was placed on an aluminum pan, the pan was mounted on the measurement apparatus, and then the glass transition temperature was measured in a range of −50° C. to 300° C. (10° C./min, 2 cycle).

Measurement of Surface Energy

Surface energy was measured using a drop shape analyzer (DSA100, manufactured by KRUSS corporation) according to an Owens-Wendt-Rabel-Kaelble method.

Specifically, 15 wt % of the first resin or the second resin was dissolved in a methyl ethyl ketone solvent, with which an LCD glass was bar-coated. Subsequently, the coated LCD glass was pre-dried for 2 minutes in oven at 60° C., and dried for 1 minute in oven at 90° C.

After drying (or curing), deionized water and diiodomethane each were added dropwise 10 times onto the coated surface, and an average value of contact angles was determined, surface energy was calculated by the Owens-Wendt-Rabel-Kaelble method with the substitution of the average value.

Measurement of Melt Viscosity

Melt viscosity was measured using a capillary rheometer (Capillary Rheometer 1501, manufactured by Gottfert Inc.).

Specifically, a capillary die was attached to a barrel filled with the first resin or the second resin three times. Subsequently, shear viscosity (pa*s) was measured according to a shear rate of 100 to 1000 $s^{-1}$ at a processing temperature of 240° C.

Measurement of Molecular Weight Distribution (PDI) and Weight Average Molecular Weight (Mw)

A molecular weight distribution was measured using Gel permeation chromatography (GPC), and conditions thereof were as follows:

Apparatus: 1200 series manufacture by Agilent technologies Inc.
Column: Use of two PLgel mixed B's manufactured by Polymer laboratories Inc.
Solvent: THF
Column temperature: 40° C.
Sample concentration: 1 mg/mL, 100L injection
Standard: polystyrene (Mp: 3900000, 723000, 316500, 52200, 31400, 7200, 3940, 485)

ChemStation manufactured by Agilent technologies Inc. was used as an analysis program, weight average molecular weight (Mw) and number average molecular weight were determined by GPC, and the molecular weight distribution was calculated as the weight average molecular weight (Mw) divided by the number average molecular weight (Mw).

Observation of Cross-Sectional Morphology

Layer-separated cross-sectional morphology was observed by SEM after subjecting a specimen of each of Examples and Comparative Examples to a low temperature impact test and etching a broken surface with THF vapor. Meanwhile, in order to measure the thickness of each of the layer-separated first resin layer, second resin layer and interface layer, the specimen of each of the Examples and Comparative Examples was cut with a diamond cutter at −120° C. using a microtoming apparatus (Leica EM FC6), to make a cross-section smooth. A cross-sectional portion of the specimen including the smooth cross-section was dipped and etched for 10 seconds in 1,2-dichloroethane solution (10 volume %, in EtOH), and then washed with distilled water. The etched cross-section portion is dissolved differently depending on the content of each of the first resin and the second resin, which may be observed using SEM. In other words, the first resin layer, the second resin layer, and the interface layer were observed through shadows by viewing the cross-section from above 45° from the surface using SEM, and the thickness of each layer could be measured.

Pencil Hardness Test

Surface pencil hardness of a specimen of each of the Examples and Comparative Examples under a predetermined gravity of 500 g was measured using a pencil hardness tester (chungbuk technology). While a standard pencil (Mitsubishi Corporation) was changed to 6B to 9H, the change rate at the surface was observed by applying a scratch with the pencil keeping an angle of 45° (ASTM 3363-74). A measurement result was calculated by averaging results of five repeated tests.

Impact Resistance Measurement Test

Impact resistance of the specimen prepared in each of the Examples and Comparative Examples was measured according to ASTM D256. Specifically, energy (Kg*cm/cm) for breaking a V-type notched specimen after raising a weight hung at the end of a pendulum was measured using an impact testing machine (Impact 104, manufactured by Tinius Olsen Inc.). Impact resistance of each of 1/8" and 1/4" specimens was calculated by averaging the results of five measurements.

Surface Analysis by Infrared Spectrometer (IR)

Spectrum measurement and data processing were performed using Win-IR PRO 3.4 software (Varian, USA), using a UMA-600 infrared microscope equipped with a Varian FTS-7000 spectrometer (Varian, USA) and a mercury cadmium telluride (MCT) detector, and conditions thereof were as follows.

Germanium (Ge) ATR crystal having a refractive index of 4.0
Scanning mid-infrared spectrum from 4000 $cm^{-1}$ to 600 $cm^{-1}$ by 16 at a spectral resolution of 8 $cm^{-1}$ by an attenuated total reflection (ATR) method
Internal reference band: carbonyl group of acrylate (C=O str., ~1725 $cm^{-1}$)
Inherent component of first resin: butadiene compound [C=C str.(~1630 $cm^{-1}$) or =C—H out-of-plane vib. (~970 $cm^{-1}$)]
Peak intensity ratio [IBD(C=C)/IA(C=O)] and [IBD (out-of-plane)/IA(C=O)] were calculated, and spectrum measurement was performed five times in different regions of one sample, and an average value and standard deviation were calculated.

Example 1

(1) Preparation of First Resin and Second Resin and Measurement of Physical Properties As a first resin, a thermoplastic resin consisting of 60 wt % of methyl methacrylate, 7 wt % of acrylonitrile, 10 wt % of butadiene, and 23 wt % of stryrene was used. In order to prepare a second resin, 1500 g of distilled water and 4 g of 2% aqueous polyvinylalcohol solution as a dispersant were added and dissolved in a 3 L reactor. Subsequently, 776 g of methyl methacrylate and 24 g of methacryloxypropyl terminated polydimethylsiloxane (PDMS, Mw:420), 2.4 g of n-dodecyl mercaptane as a chain transfer agent, and 2.4 g of azobisdimethylvaleronitrile as an initiator were additionally added to the reactor, followed by stirring at 400 rpm. The blend was reacted and polymerized for 3 hours at 60° C., and cooled to 30° C. to obtain a second resin (A) with a bead shape. Subsequently, the second resin (A) was washed three times with distilled water and dehydrated, and then was dried in an oven.

The first resin and the second resin (A) had a surface energy difference of 7 mN/m and a melt viscosity difference of 300 pa*s. The first resin had a glass transition temperature of 70° C. and the second resin (A) had a glass transition temperature of 104° C. The second resin (A) had a weight average molecular weight of 100 K and a molecular weight distribution (PDI) of 1.9, which were measured by GPC.

(2) Preparation of Resin Blend and Measurement of Physical Properties 90 parts by weight of the first resin and 10 parts by weight of the second resin (A) were mixed and extruded at a temperature of 240° C. using a twin screw extruder (Leistritz corporation) to obtain a pellet. Then, the pellet was injected at a temperature of 240° C. in a EC100ϕ30 injector (ENGEL) to manufacture a resin molding specimen 1 having a thickness of 3200 μm. The layer separation phenomenon was observed in the specimen, which included a second resin layer having a thickness of 18 μm and an interface layer having a thickness of 8 μm, a pencil hardness of H, and an impact resistance of 9 kg*cm/cm in the case of IZOD 1/8" and of 9 kg*cm/cm in the case of IZOD 1/4".

Example 2

(1) Preparation of First Resin and Second Resin and Measurement of Physical Properties A first resin was the same as in Example 1, and a second resin (B) was prepared in the same manner as in Example 1, except that 776 g of methyl methacrylate and 24 g of methacryloxypropyl terminated polydimethylsiloxane (Mw:420) were changed to 760 g of methyl methacrylate, 24 g of methacryloxypropyl terminated polydimethylsiloxane (Mw: 1000).

The first resin and the second resin (B) had a surface energy difference of 13 mN/m and a melt viscosity difference of 330 pa*s. The second resin (B) had a glass transition temperature of 103° C., a weight average molecular weight of 100 K, and a molecular weight distribution of 2.1, which were measured by GPC.

(2) Preparation of Resin Blend and Measurement of Physical Properties

A specimen 2 having a thickness of 3200 μm was prepared in the same manner as in Example 1, except that the second resin (B) was used. The layer separation phenomenon was observed in the specimen, which included a second resin layer having a thickness of 43 μm and an interface layer having a thickness of 19 μm, a pencil hardness of 2H, and an impact resistance of 9 kg*cm/cm in the case of IZOD 1/8" and of 9 kg*cm/cm in the case of IZOD 1/4".

Example 3

(1) Preparation of First Resin and Second Resin and Measurement of Physical Properties A first resin was the same as in Example 1, and a second resin (C) was prepared in the same manner as in Example 1, except that 776 g of methyl methacrylate and 24 g of methacryloxypropyl terminated polydimethylsiloxane (Mw:420) were changed to 760 g of methyl methacrylate and 24 g of methacryloxypropyl terminated polydimethylsiloxane (Mw: 5000).

The first resin and the second resin (C) had a surface energy difference of 14 mN/m and a melt viscosity difference of 335 pa*s. The second resin (C) had a glass transition temperature of 100° C., a weight average molecular weight of 100 K, and a molecular weight distribution of 2.4, which were measured by GPC.

(2) Preparation of Resin Blend and Measurement of Physical Properties

A specimen 3 having a thickness of 3200 μm was prepared in the same manner as in Example 1, except that the second resin (C) was used. The layer separation phenomenon was observed in the specimen, which included a second resin layer having a thickness of 35 μm and an interface layer having a thickness of a pencil hardness of H, and an impact resistance of 8 kg*cm/cm in the case of IZOD 1/8" and of 8 kg*cm/cm in the case of IZOD 1/4".

Example 4

(1) Preparation of First Resin and Second Resin and Measurement of Physical Properties A first resin was the same as in Example 1, and a second resin (D) was prepared in the same manner as in Example 1, except that 776 g of methyl methacrylate and 24 g of methacryloxypropyl terminated polydimethylsiloxane (Mw:420) were changed to 744 g of methyl methacrylate and 56 g of methacryloxypropyl terminated polydimethylsiloxane (Mw: 1000).

The first resin and the second resin (D) had a surface energy difference of 15 mN/m and a melt viscosity difference of 390 pa*s. The second resin (D) had a glass transition temperature of 100° C., a weight average molecular weight of 100 K, and a molecular weight distribution of 2.5, which were measured by GPC.

(2) Preparation of Resin Blend and Measurement of Physical Properties

A specimen 4 having a thickness of 3200 μm was prepared in the same manner as in Example 1, except that the second resin (D) was used. The layer separation phenomenon was observed in the specimen, which included a second resin layer having a thickness of 43 μm and an interface layer having a thickness of a pencil hardness of 1.5H, and an impact resistance of 8 kg*cm/cm in the case of IZOD 1/8" and of 8 kg*cm/cm in the case of IZOD 1/4".

Example 5

(1) Preparation of First Resin and Second Resin and Measurement of Physical Properties A first resin was the same as in Example 1, and a second resin (E) was prepared in the same manner as in Example 1, except that 776 g of methyl methacrylate and 24 g of methacryloxypropyl terminated polydimethylsiloxane (PDMS, Mw:420) were changed to 720 g of methyl methacrylate and 80 g of methacryloxypropyl terminated polydimethylsiloxane (PDMS, Mw:1000).

The first resin and the second resin (E) had a surface energy difference of 18 mN/m and a melt viscosity difference of 420 pa*s. The second resin (E) had a glass transition temperature of 97° C., a weight average molecular weight of 100 K, and a molecular weight distribution of 2.6, which were measured by GPC.

(2) Preparation of Resin Blend and Measurement of Physical Properties

A specimen 5 having a thickness of 3200 μm was prepared in the same manner as in Example 1, except that the second resin (E) was used. The layer separation phenomenon was observed in the specimen, which included a second resin layer having a thickness of 48 μm and an interface layer having a thickness of a pencil hardness of H, and an impact resistance of 7 kg*cm/cm in the case of IZOD 1/8" and of 7 kg*cm/cm in the case of IZOD 1/4".

Example 6

(1) Preparation of First Resin and Second Resin and Measurement of Physical Properties A first resin was the same as in Example 1, and a second resin (F) was prepared in the same manner as in Example 1, except that 776 g of methyl methacrylate and 24 g of methacryloxypropyl terminated polydimethylsiloxane (Mw:420) were changed to 536 g of methyl methacrylate, 240 g of cyclohexyl methacrylate and 24 g of methacryloxypropyl terminated polydimethylsiloxane (Mw:1000).

The first resin and the second resin (F) had a surface energy difference of 14 mN/m and a melt viscosity difference of 460 pa*s. The second resin (F) had a glass transition temperature of 100° C., a weight average molecular weight of 100 K, and a molecular weight distribution of 2.2, which were measured by GPC.

(2) Preparation of Resin Blend and Measurement of Physical Properties

A specimen 6 having a thickness of 3200 μm was prepared in the same manner as in Example 1, except that the second resin (F) was used. The layer separation phenomenon was observed in the specimen, which included a second resin layer having a thickness of 86 μm and an interface layer having a thickness of a pencil hardness of 2.5H, and an impact resistance of 9 kg*cm/cm in the case of IZOD 1/8" and of 9 kg*cm/cm in the case of IZOD 1/4". Peak intensity ratio [IBD(C═C)/IA(C═O)] measured by an infrared spectrometer had an average value of 0.0122 and a standard deviation of 0.0004. Peak intensity ratio [IBD(out-of-plane)/IA(C═O)] measured by an infrared spectrometer had an average value of 0.415 and a standard deviation of 0.0028.

Example 7

(1) Preparation of First Resin and Second Resin and Measurement of Physical Properties A first resin was the same as in Example 1, and a second resin (G) was prepared in the same manner as in Example 1, except that 776 g of methyl methacrylate and 24 g of methacryloxypropyl terminated polydimethylsiloxane (Mw:420) were changed to 536 g of methyl methacrylate, 240 g of phenyl methacrylate and 24 g of methacryloxypropyl terminated polydimethylsiloxane (Mw: 1000).

The first resin and the second resin (G) had a surface energy difference of 16 mN/m and a melt viscosity difference of 445 pa*s. The second resin (G) had a glass transition temperature of 105° C., a weight average molecular weight of 100 K, and a molecular weight distribution of 2.1, which were measured by GPC.

(2) Preparation of Resin Blend and Measurement of Physical Properties

A specimen 7 having a thickness of 3200 μm was prepared in the same manner as in Example 1, except that the second resin (G) was used. The layer separation phenomenon was observed in the specimen, which included a second resin layer having a thickness of 90 μm and an interface layer having a thickness of 32 μm, a pencil hardness of 2.5H, and an impact resistance of 9 kg*cm/cm in the case of IZOD 1/8" and of 9 kg*cm/cm in the case of IZOD 1/4".

Example 8

(1) Preparation of First Resin and Second Resin and Measurement of Physical Properties A first resin was the same as in Example 1, and a second resin (H) was prepared in the same manner as in Example 1, except that 776 g of methyl methacrylate and 24 g of methacryloxypropyl terminated polydimethylsiloxane (Mw:420) were changed to 536 g of methyl methacrylate, 120 g of acrylamide, 120 g of hydroxyethyl methacrylate, and 24 g of methacryloxypropyl terminated polydimethylsiloxane (Mw: 1000).

The first resin and the second resin (H) had a surface energy difference of 5 mN/m and a melt viscosity difference of 390 pa*s. The second resin (H) had a glass transition temperature of 125° C., a weight average molecular weight of 100 K, and a molecular weight distribution of 2.3, which were measured by GPC.

(2) Preparation of Resin Blend and Measurement of Physical Properties

A specimen 8 having a thickness of 3200 μm was prepared in the same manner as in Example 1, except that the second resin (H) was used. The layer separation phenomenon was observed in the specimen, which included a second resin layer having a thickness of 63 μm and an interface layer having a thickness of 27 μm, a pencil hardness of 2H, and an impact resistance of 7 kg*cm/cm in the case of IZOD 1/8" and of 7 kg*cm/cm in the case of IZOD 1/4".

Example 9

(1) Preparation of First Resin and Second Resin and Measurement of Physical Properties A first resin was the same as in Example 1, and a second resin (I) was prepared in the same manner as in Example 1, except that 776 g of methyl methacrylate and 24 g of methacryloxypropyl terminated polydimethylsiloxane (Mw:420) were changed to 536 g of methyl methacrylate, 240 g of hydroxyethyl methacrylate, and 24 g of methacryloxypropyl terminated polydimethylsiloxane (Mw:1000).

The first resin and the second resin (I) had a surface energy difference of 6 mN/m and a melt viscosity difference of 440 pa*s. The second resin (I) had a glass transition temperature of 110° C., a weight average molecular weight of 100 K, and a molecular weight distribution of 2.0, which were measured by GPC.

(2) Preparation of Resin Blend and Measurement of Physical Properties

A specimen 9 having a thickness of 3200 μm was prepared in the same manner as in Example 1, except that the second resin (I) was used. The layer separation phenomenon was observed in the specimen, which included a second resin layer having a thickness of 52 μm and an interface layer having a thickness of a pencil hardness of H, and an impact resistance of 9 kg*cm/cm in the case of IZOD 1/8" and of 9 kg*cm/cm in the case of IZOD 1/4".

Example 10

(1) Preparation of First Resin and Second Resin and Measurement of Physical Properties A first resin was the same as in Example 1, and a second resin (J) was prepared in the same manner as in Example 1, except that 776 g of methyl methacrylate and 24 g of methacryloxypropyl terminated polydimethylsiloxane (Mw:420) were changed to 536 g of methyl methacrylate, 120 g of vinylpyrrolidone, 120 g of hydroxyethyl methacrylate, and 24 g of methacryloxypropyl terminated polydimethylsiloxane (Mw:1000).

The first resin and the second resin (J) had a surface energy difference of 5 mN/m and a melt viscosity difference of 400 pa*s. The second resin (J) had a glass transition temperature of 113° C., a weight average molecular weight of 100 K, and a molecular weight distribution (PDI) of 2.3, which were measured by GPC.

(2) Preparation of Resin Blend and Measurement of Physical Properties

A specimen 10 having a thickness of 3200 μm was prepared in the same manner as in Example 1, except that the second resin (J) was used. The layer separation phenomenon was observed in the specimen, which included a second resin layer having a thickness of 61 μm and an interface layer having a pencil hardness of 1.5H, and an impact resistance of 8 kg*cm/cm in the case of IZOD 1/8" and of 8 kg*cm/cm in the case of IZOD 1/4".

Comparative Example 1

100 parts by weight of the first resin pellet which is the same as in Example 1 was dried in an oven and injected at a temperature of 240° C. in a EC100φ30 injector (ENGEL) to manufacture a specimen 11 having a thickness of 3200 μm.

As a result of measuring physical properties of the specimen 11 thus manufactured, the specimen 11 had a glass transition temperature (Tg) of 70° C., an impact resistance of 10 kg*cm/cm in the case of IZOD 1/8" and of 10 kg*cm/cm in the case of IZOD 1/4", and a pencil hardness of F.

Comparative Example 2

A first resin was the same as in Example 1, and a second resin (K) was prepared in the same manner as in Example 1, except that 776 g of methyl methacrylate and 24 g of methacryloxypropyl terminated polydimethylsiloxane (Mw:420) were changed to 400 g of methyl methacrylate, and 400 g of methacryloxypropyl terminated polydimethylsiloxane (Mw: 5000).

The first resin and the second resin (K) had a surface energy difference of 25 mN/m, a melt viscosity difference of 600 pa*s, and the second resin (K) had a glass transition temperature of 50° C. The resin (K) had a weight average molecular weight of 100 K and a molecular weight distribution of 4.5, which were measured by GPC.

(2) Preparation of Resin Blend and Measurement of Physical Properties

A specimen 12 was prepared in the same manner as in Example 1, except that the second resin (K) was used. The specimen peeled and thus a layer separation phenomenon could not be observed, and pencil hardness could not be measured. Further, a thickness of the second resin layer and a thickness of the interface layer could not be measured. The specimen had an impact resistance of 2 kg*cm/cm in the case of IZOD 1/8" and of 1 kg*cm/cm in the case of IZOD 1/4".

Comparative Example 3

A first resin was the same as in Example 1 and a second resin used polymethyl methacrylate (LGMMA IF870). The first resin and the second resin had no surface energy difference, a melt viscosity difference of 270 pa*s, and the second resin had a glass transition temperature of 104° C. The second resin had a weight average molecular weight of 73K and a molecular weight distribution (PDI) of 1.9, which were measured by GPC.

(2) Preparation of Resin Blend and Measurement of Physical Properties

A specimen 13 was prepared in the same manner as Example 1 except that the polymethyl methacrylate was used. The specimen showed no layer separation phenomenon. Therefore, a thickness of the second resin layer and a thickness of the interface layer could not be measured. The specimen had a pencil harness of H, and an impact resistance of 5.2 kg*cm/cm in the case of IZOD 1/8" and of 4.9 kg*cm/cm in the case of IZOD 1/4".

Comparative Example 4

100 parts by weight of the first resin pellet which is the same as in Example 1 was dried in an oven and injected at a temperature of 240° C. in a EC100φ30 injector (ENGEL) to manufacture a specimen.

A self-manufactured pollution-resistant hard coating liquid containing polyfunctional acrylate (17.5 wt % of dipentaerythritol hexylacrylate (DPHA), 10 wt % of pentaerythritol triacrylate (PETA), 1.5 wt % of perfluorohexylethyl methacrylate, 5 wt % of urethane acrylate (EB 1290, SK cytech co., Ltd.), 45 wt % of methyl ethyl ketone, 20 wt % of isopropyl alcohol, 1 wt % of a UV initiator (IRGACURE 184, manufactured by Ciba corporation)) was coated on the specimen with Mayer bar #9 and dried for about 4 minutes in a range of 60 to 90° C. to form a film. Subsequently, the liquid composition coating was cured by UV irradiation at an intensity of 3,000 mJ/cm² to form a hard coating film.

The hard coating film had a pencil hardness of 3H, and peak intensity ratio [IBD(C=C)/IA(C=O)] and peak intensity ratio [IBD(out-of-plane)/IA(C=O)] measured by an infrared spectrometer had an average value of 0 and a standard deviation of 0.

What is claimed is:
1. A resin blend comprising:
   a first resin; and
   a second resin having a hydrophobic functional group represented by the following Chemical Formula 1 in a side chain, and having a surface energy difference of 5 to 20 mN/m from the first resin at 25° C., and a molecular weight distribution of 1 to 3.0:

[Chemical Formula 1]

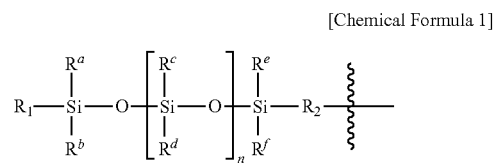

wherein, $R_1$ is an alkyl group having 1 to 16 carbon atoms, $R_2$ is a single bond or an alkylene group having 1 to 16 carbon atoms, $R^a$ to $R^f$ are each independently an alkyl group having 1 to 16 carbon atoms, and n is a number from 1 to 100, wherein the first resin is an ABS resin and the second resin is a (meth)acrylate-based resin, and the ABS resin and the (meth)acrylate-based resin have a melt viscosity difference of 300 to 500 pa*s at a shear rate of 100 to 1000 s⁻¹ and at a processing temperature of the resin blend of 210° C. to 240° C., wherein the second resin in an amount of 0.1 parts by weight to 50 parts by weight based on the 100 parts by weight of the first resin, and wherein the resin blend is forming a layer separation structure during a melt processing.

2. The resin blend of claim 1, wherein the second resin has higher glass transition temperature than the first resin and the first resin and the second resin have a glass transition temperature difference of 10° C. to 150° C.

3. The resin blend of claim 1, wherein the second resin has a weight average molecular weight of 30,000 to 200,000.

4. The resin blend of claim 1, wherein the second resin further includes at least one organic functional group selected from a group consisting of an alkyl group having 2 to 20 carbon atoms, an alicyclic ring having 5 to 40 carbon atoms, and an aromatic ring having 6 to 40 carbon atoms.

5. The resin blend of claim 1, wherein the second resin further includes a hydrogen bond donor and a hydrogen bond acceptor.

6. The resin blend of claim 1, wherein the second resin includes a monomer represented by the following Chemical Formula 2 as a polymerization unit:

[Chemical Formula 2]

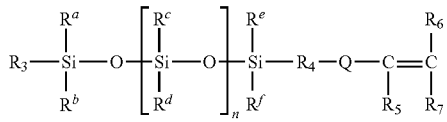

wherein, $R_3$ is an alkyl group having 1 to 16 carbon atoms, $R_4$ is a single bond or an alkylene group having 1 to 16 carbon atoms, Q is a single bond, —COO—, —OCO—, —OCOO—, —CO—, —O—, or —NH—, $R_5$ to $R_7$ are each independently hydrogen or an alkyl group having 1 to 4 carbon atoms, $R^a$ to $R^f$ are each independently an alkyl group having 1 to 16 carbon atoms, and n is a number from 1 to 100.

7. The resin blend of claim 6, wherein the second resin is a polymer polymerized from a monomer blend containing 0.1 to 30 parts by weight of the monomer represented by Chemical Formula 2 based on 100 parts by weight of the entire monomer for polymerizing the second resin.

8. A method of preparing a resin molding article comprising: melting the resin blend of claim 1 to form a melt blend; and processing the melt blend to form a layer separation structure.

9. The method of preparing a resin molding article of claim 8, further comprising curing the layer separation structure of the resin blend.

10. The method of preparing a resin molding article of claim 9, wherein the curing is thermosetting or ultraviolet (UV) curing.

11. The method of preparing a resin molding article of claim 8, wherein the melting and the processing are performed under shear stress.

12. A pellet comprising:
a core containing a first resin, and
a shell containing a second resin having a hydrophobic functional group represented by the following Chemical Formula 1 in a side chain and having a surface energy difference of 5 to 20 mN/m from the first resin at 25° C. and a molecular weight distribution of 1 to 3.0:

[Chemical Formula 1]

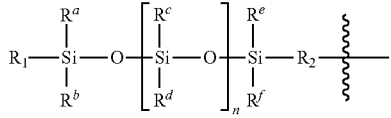

wherein, $R_1$ is an alkyl group having 1 to 16 carbon atoms, $R_2$ is a single bond or an alkylene group having 1 to 16 carbon atoms, $R^a$ to $R^f$ are each independently an alkyl group having 1 to 16 carbon atoms, and n is a number from 1 to 100, wherein, the first resin is an ABS resin and the second resin is a (meth)acrylate-based resin, and the ABS resin and the (meth)acrylate-based resin have a melt viscosity difference of 300 to 500 pa*s at a shear rate of 100 to 1000 $s^{-1}$ and at a processing temperature of the resin blend of 210° C. to 240° C., wherein the second resin in an amount of 0.1 parts by weight to 50 parts by weight based on the 100 parts by weight of the first resin, and wherein the second resin is layer-separated from the first resin.

13. A method of preparing a resin molding article comprising: melting the pellet of claim 12 to form a melt blend; and processing the melt blend to form a layer separation structure.

* * * * *